(12) United States Patent
Debras et al.

(10) Patent No.: US 7,019,044 B2
(45) Date of Patent: *Mar. 28, 2006

(54) PRODUCTION OF POLYOLEFINS HAVING IMPROVED PROPERTIES

(75) Inventors: Guy Debras, Frasnes-lez-Gosselies (BE); Marc Dupire, Mons (BE); Jacques Michel, Seneffe (BE)

(73) Assignee: Total Petrochemicals Research Feluy, Feluy (BE)

( * ) Notice: Subject to any disclaimer, the term of this patent is extended or adjusted under 35 U.S.C. 154(b) by 102 days.

This patent is subject to a terminal disclaimer.

(21) Appl. No.: 10/312,907

(22) PCT Filed: Jun. 27, 2001

(86) PCT No.: PCT/EP01/07306

§ 371 (c)(1),
(2), (4) Date: Sep. 11, 2003

(87) PCT Pub. No.: WO02/02653

PCT Pub. Date: Jan. 10, 2002

(65) Prior Publication Data

US 2004/0054024 A1    Mar. 18, 2004

(30) Foreign Application Priority Data

Jul. 5, 2000 (EP) .................. 00202345

(51) Int. Cl.
C08F 2/46 (2006.01)

(52) U.S. Cl. ............ 522/158; 522/113; 522/157; 522/150; 522/160; 522/161

(58) Field of Classification Search ........... 522/113, 522/157, 158, 160, 161, 150

See application file for complete search history.

(56) References Cited

U.S. PATENT DOCUMENTS

| 2,948,666 | A | | 8/1960 | Lawton | |
|---|---|---|---|---|---|
| 5,047,446 | A | * | 9/1991 | DeNicola, Jr. | 522/157 |
| 5,411,994 | A | | 5/1995 | Galli et al. | |
| 5,414,027 | A | * | 5/1995 | DeNicola et al. | 522/112 |
| 5,554,668 | A | | 9/1996 | Scheve et al. | |
| 5,560,886 | A | * | 10/1996 | Saito et al. | 264/485 |
| 5,731,362 | A | * | 3/1998 | Scheve et al. | 521/142 |
| 5,820,981 | A | * | 10/1998 | Williams et al. | 428/364 |
| 5,883,151 | A | | 3/1999 | Raetzsch et al. | |
| 6,136,926 | A | | 10/2000 | Raetzsch et al. | |
| 6,632,854 | B1 | * | 10/2003 | Charlier | 522/157 |
| 6,699,919 | B1 | * | 3/2004 | Charlier | 522/149 |

FOREIGN PATENT DOCUMENTS

| CA | 2198651 | | 8/1997 |
|---|---|---|---|
| EP | 0190889 | A2 | 8/1986 |
| EP | 0351866 | A2 | 1/1990 |
| EP | 0451804 | A2 | 10/1991 |
| EP | 0519341 | A1 | 12/1992 |
| EP | 0520773 | A2 | 12/1992 |
| EP | 0634441 | A1 | 1/1995 |
| EP | 0678527 | A2 | 10/1995 |
| EP | 0799839 | A2 | 10/1997 |
| WO | WO 97/08216 | A1 | 3/1997 |

* cited by examiner

Primary Examiner—Sanza L. McClendon
(74) Attorney, Agent, or Firm—William D. Jackson

(57) ABSTRACT

A process for producing polypropylene having increased melt strength, the process comprising (i) homopolymerising polypropylene or copolymerising propylene with one or more comonomers selected from ethylene and C4 to C101-olefins to produce a polypropylene homopolymer or copolymer respectively having a double bond concentration of at least 0.1 per 10,000 carbon atoms, (11) irradiating the polypropylene with an electron beam having an energy of at least 5 MeV and at radiation dose of at least 5 kGray, and (iii) melting and mechanically processing the melt of polypropylene to form long chain branches on the polypropylene molecules.

16 Claims, 8 Drawing Sheets

PRODUCTION OF POLYOLEFINS HAVING IMPROVED PROPERTIES

The present invention relates to a method for the production of polyolefins, in particular polypropylene, having improved properties, in particular high melt strength. In particular, the present invention relates to a process for the production of polypropylene having improved properties by irradiating polypropylene with a high energy electron beam.

Polypropylene resin is used in a variety of different applications. However, polypropylene resin suffers from the problem of having a low melt strength at high melt index, which restricts the use of polypropylene in a number of applications because the polypropylene is difficult to process. It is known in the art to increase the melt strength of polypropylene, for example by irradiating the polypropylene with an electron beam. It is known that electron beam irradiation significantly modifies the structure of a polypropylene molecule. The irradiation of polypropylene results in chain scission and grafting (or branching) which can occur simultaneously. Up to a certain level of irradiation dose, it is possible to produce from a linear polypropylene molecule having been produced using a Ziegler-Natta catalyst, a modified polymer molecule having free-end long branches, otherwise known as long chain branching.

It is known that such long chain branching drastically modifies the rheological behaviour of the polypropylene, for example their elongational and shear viscosity.

EP-A-0678527 discloses a process for producing a modified polypropylene in which polypropylene and a cross-linking agent mixture are irradiated with ionising radiation so as to give an absorbed dosage of 1 to 20 kGy, with subsequent heat-treating of the resultant material. In Example 1 it is disclosed that the irradiation conditions have an accelerated voltage of 2 MW and an electric current of 1.0 mA.

WO-A-97/08216 discloses a method for producing diene-modified propylene polymers which are irradiated. It is disclosed that the irradiation is preferably carried out using E-beam or γ radiation at a dose of about 1 to about 20 Mrad for a few seconds. It is disclosed that polypropylene made be modified with a diene and then irradiated to cause chain extension.

EP-A-0634441 discloses a process for making a high melt strength propylene polymer by high energy radiation. The dose range is disclosed as being from 1 to 10,000 Mrads per minute and it is disclosed that the ionising radiation should have sufficient energy to penetrate to the extent desired in the mass of linear, propylene polymer material being radiated. There is also disclosed the use of an accelerating potential (for an electron generator) of 500 to 4000 kV. Following the irradiation step the irradiated material is heated.

EP-A-0190889 discloses a process similar to that of EP-A-0634441 in that it is disclosed that the accelerating potential of an electron generator may be from 500 to 4000 kV.

EP-A-0799839 also has a similar disclosure to EP-A-0634441 and discloses the use of an electron generator having accelerating potential of 500 to 4000 kV.

EP-A-0451804 discloses a method of increasing the molecular weight of syndiotactic polypropylene by irradiation in the absence of oxygen. This specification does not disclose any energy range for the irradiation. The dose of the irradiation may be from 0.1 to 50 Mrad. After irradiation, the polypropylene may be heated.

EP-A-0351866 has a yet further similar disclosure to EP-A-0634441 and discloses the use of an electron generator having an accelerating potential of 500 to 4000 kV.

U.S. Pat. No. 5,554,668 discloses a process for irradiating polypropylene to increase the melt strength thereof. An increase in the melt strength is achieved by decreasing the melt flow rate, otherwise known as the melt index. It is disclosed that a linear propylene polymer material is irradiated with high energy ionising radiation, preferably an electron beam, at a dose rate in the range of from about 1 to $1 \times 10^4$ Mrads per minute for a period of time sufficient for a substantial amount of chain scission of the linear, propylene polymer molecule to occur but insufficient to cause gelation of the material. Thereafter, the material is maintained for a period of time sufficient for a significant amount of long chain branches to form. Finally, the material is treated to deactivate substantially all free radicals present in the irradiated material. It is disclosed that for an electron beam, the electrons are beamed from an electron generator having an accelerating potential (i.e. an energy) of from 500 to 4000 kV. Typically, the polypropylene material to be irradiated is in particulate form and is conveyed on a conveyor belt beneath an electron beam generator which continuously irradiates the polypropylene particles as they are translated thereunder by the conveyor belt. The resultant polyethylene has improved melt strength as represented by a decrease in the melt flow rate. A disadvantage of the process disclosed in U.S. Pat. No. 5,554,668 is that the production rate of the irradiated polypropylene is relatively low, because the speed of the conveyor belt is low and only a small volume of material is processed. This results in difficulties in commercial implementation of the process. In addition, the specification discloses the use of a very broad range of dose rates i.e. from 1 to $1 \times 10^4$ Mrads per minute. High dose rates of greater than about 40 Mrad can result in a substantially fully cross-linked structure of the polypropylene. Such a cross-linked structure is difficult to process.

EP-A-0520773 discloses an expandable polyolefin resin composition including polypropylene optionally blended with polyethylene. In order to prepare a cross-linked foam, a sheet of expandable resin composition is irradiated with ionising radiation to cross-link the resin. The ionising radiation may include electron rays, at a dose of from 1 to 20 Mrad. It is disclosed that auxiliary cross-linking agents may be employed which include a bifunctional monomer, exemplified by 1,9-nonanediol dimethyacrylate.

U.S. Pat. No. 2,948,666 and U.S. Pat. No. 5,605,936 disclose processes for producing irradiated polypropylene. The latter specification discloses the production of a high molecular weight, non-linear propylene polymer material characterised by high melt strength by high energy irradiation of a high molecular weight linear propylene polymer. It is disclosed that the ionising radiation for use in the irradiation step may comprise electrons beamed from an electron generator having an accelerating potential of 500 to 4000 kV. For a propylene polymer material without a polymerised diene content, the dose of ionising radiation is from 0.5 to 7 Mrad. For propylene polymer material having a polymerised diene content, the dose is from 0.2 to 2 Mrad.

EP-A-0821018 discloses the preparation of cross linkable olefinic polymers which have been subjected to ionising radiation. The specification exemplifies electron beams of relatively low energy and low doses to split polymeric chains in order to graft silane derivatives onto the polymeric chain. The specification does not address the problem of achieving high melt strength of polymers.

EP-A-0519341 discloses the grafting of vinyl monomers on particulate olefin polymers by irradiating the polymer and treating with a grafting monomer. In an example, polypropylene is irradiated with an electron beam having an energy of 2 MeV and subsequently treated with maleic anhydride as a grafting monomer.

U.S. Pat. No. 5,411,994 discloses the production of graft copolymers of polyolefins in which a mass of olefin polymer particles is irradiated and thereafter the mass is treated with a vinyl monomer in liquid form. The ionising radiation dose is about 1 to 12 Mrad and the ionising radiation preferably comprises electrons beamed from an electron generator having an accelerating potential of 500 to 4000 kV. The polymer is first irradiated and then treated with a grafting agent.

EP-A-0792905 discloses the continuous production of polypropylene mixtures of increased stress crack resistance and melt strength by the action of ionising radiation. The energy of the ionising radiation is from 150 to 300 keV and the radiation dose ranges from 0.05 to 12 Mrad.

It is further known that when irradiating isotactic polypropylene which has been produced using conventional Ziegler-Natta catalysts, the irradiation of the polypropylene with an electron beam produces free radicals and there is a competition between chain scission and branching which is in favour of chain scission. It is known to use branching agents, for example multi-vinylic compounds, to displace the equilibrium towards the achievement of branching. For example CA-A-2198651 discloses that bifunctional, unsaturated monomers can be added before and/or during the irradiation. Such compounds may include divinyl compounds, alkyl compounds, dienes or mixtures thereof. These bifunctional, unsaturated monomers can be polymerised with the help of free radicals during the irradiation. Butadiene is particularly preferred.

CA-A-2198651 also discloses a continuous method for producing polypropylene mixtures of increased stress-crack resistance and melt strength in which a low-energy electron beam accelerator with an energy of from 150 to 300 keV at a radiation dose of 0.05 to 12 Mrads is employed. This process also suffers from the disadvantage that the production rate of the irradiated powder can be somewhat low for commercial acceptance. Moreover, the polypropylene powder to be irradiated must be in the form of very fine particles.

The use of such branching (or grafting) agents leads to the disadvantages of increased cost and increased possibility of environmental problems, in particular toxicity, as a result of adding branching or grafting agent to the polypropylene.

It is also known to irradiate polypropylene copolymers of propylene and dienes, for example 1,5-hexadiene. The use of such copolymer complicates substantially the polymerisation procedure.

The present invention aims to provide a process for producing polyolefin resins in particular polypropylene resins, having improved properties, in particular improved melt strength, and also optionally which can be manufactured at a high production rate. It is another aim of the present invention to provide a process for producing polyolefins which avoids the need for a branching or grafting reagent during or following an irradiation step. It is also an aim of the invention to provide such a process which provides substantially increased long chain branching on the polypropylene molecules following the irradiation. It is a further aim to produce polypropylene having improved melt strength.

Accordingly, the present invention provides a process for producing polypropylene having increased melt strength, the process comprising (i) homopolymerising propylene or copolymerising propylene with one or more comonomers selected from ethylene and $C_4$ to $C_{10}$ 1-olefins to produce a polypropylene homopolymer or copolymer respectively having a double bond concentration of at least 0.1 per 10,000 carbon atoms, (ii) irradiating the polypropylene with an electron beam having an energy of at least 5 MeV and at a radiation dose of at least 5 kGray, and (iii) melting and mechanically processing the melt of polypropylene to form long chain branches on the polypropylene molecules.

The present invention also provides a process for producing polypropylene having increased melt strength, the process comprising irradiating polypropylene which has been polymerised using a metallocene catalyst with an electron beam having an energy of at least 5 MeV and a radiation dose of at least 5 kGray and melting and mechanically processing the melt of the irradiated polypropylene to form long chain branches on the polypropylene molecules.

The double bond concentration may, for polypropylene, comprise up to 140,000/Mn double bonds per 10,000 carbon atoms, such double bonds being at the end of the polymer backbone and constituted by vinyl or vinylidene groups. In addition, there may be some further unsaturations (e.g. internal vinylidene double bonds) internally along the polymer backbone, but since these are present in low concentrations they are difficult to detect by conventional NMR methods.

The present invention is predicated on the discovery by the present inventor that high irradiation energy electron beams enable high throughput of polyolefins, in particular polypropylene, to be irradiated without the need for a branching or grafting agent, thereby making irradiation more commercially useful and with reduced environmental or toxicity problems, when the polyolefin has a high concentration of chains with olefinic unsaturations, for example end vinyl groups (i.e. vinylidene groups), which are particularly present when the polyolefin, in particular polypropylene, is polymerised with a metallocene catalyst in the absence of hydrogen. The use of a metallocene catalyst promotes hydrogen β-elimination to form unsaturated, e.g. vinylidene, end, groups. The irradiation causes the formation of free radicals in the polyolefin chains. When the irradiated polymer is subsequently mechanically processed or worked in the melt, for example by extrusion, in the absence of a grafting or branching agent this causes recombination between free radicals and available terminal double bonds, creating long chain branching without the need for a branching or grafting agent.

Furthermore, without being bound by theory, it is believed by the applicant that the presence of some regiodefects which occur in the backbone of the metallocene-catalysed polypropylene can enable easier formation of long chain branching as a result of subsequent irradiation in accordance with the invention. Metallocene-catalysed isotactic polypropylene (miPP) molecules have very few intermolecular defects (similar to atactic materials). Along the macromolecular iPP chain, regiodefects (and stereodefects) are present. The regiodefects are head-to-head structures from a 2,1 insertion into the chain and, more less frequently, an ethylene sequence from a 3,1 insertion into the chain. These defects will act as non-crystallisable units, and tend to depress the iPP melt temperature The polypropylene is produced using a metallocene catalyst which preferably has the following general formula:

$Cp_2MX_n$ where Cp is a substituted or unsubstituted cyclopenta dienyl group; M is a transition metal from Group IVB of the Periodic Table or vanadium; X is a halogen or a hydrocarbyl group having from 1–10 carbon atoms; and n is the valency of the metal M minus 2. A typical metallocene catalyst is (n-butyl Cp)$_2$ZrCl$_2$ on a silica support with methyl aluminium oxane as a cocatalyst.

Preferably, the polypropylene is irradiated at an energy of at least 10 MeV.

The polypropylene may be an isotactic polypropylene, a syndiotactic polypropylene, or a blend of isotactic and syndiotactic polypropylene. Most particularly, the polyolefin comprises polypropylene which has been polymerised using a metallocene catalyst, in particular an isotactic polypropylene polymerised using a metallocene catalyst (hereinafter referred to as "miPP"). The polypropylene or polypropylene blend may have a monomodal molecular weight distribution or a multimodal molecular weight distribution, for example a bimodal molecular weight distribution. When the polyolefin comprises polypropylene, the increase in melt strength as a result of the irradiation process can yield a melt strength for the polypropylene _which is similar to that of a polyethylene of similar melt flow index. This production of higher melt strength polypropylene enables the polypropylene to be used in a variety of different applications where melt strength is required when the polymer is processed from the melt, for example in blow moulding, blowing of films, extrusion thermoforming and in the production of foams.

The polypropylene may be a homopolymer of propylene or a random or block copolymer of propylene and one or more olefins selected from ethylene and C$_4$ to C$_{10}$ 1-olefins, which may be linear or branched. For example, the polypropylene may be an ethylene-propylene random copolymer containing up to 10 wt % ethylene. The polypropylene homopolymer may be used as a matrix phase which is toughened by rubber particles, for example ethylene-propylene rubber particles, typically in an amount of up to 30 wt %.

In the irradiation process, typically the polyolefin such as the polypropylene is deposited onto a continuously moving conveyor such as an endless belt. The polyolefin on the conveyor passes under an electron beam generator which irradiates the polyolefin. Preferably, the accelerating potential or energy of the electron beam is from 5 to 100 MeV, still more preferably at least 10 MeV, yet more preferably from 10 to 25 MeV. The power of the electron beam generator is preferably from 50 to 500 kW more preferably for 120 to 250 kW. The radiation dose to which the polyolefin is subjected is preferably from 5 to 100 kGray, yet more preferably from 10 to 60 kGray, still more preferably from 20 to 40 kGray (10 kGray is equivalent to 1 Mrad). The conveyor speed is adjusted in order to achieve the desired dose. Typically, the conveyor speed is from 0.5 to 20 metres/minute, preferably from 1 to 10 metres/minute, more preferably from 2.25 to 8.5 metres/minute.

As a result of the high irradiating potential of the electron beam, not only can the conveyor speed be significantly higher than in the prior art, but also the thickness of the continuously moving bed of polyolefin on the conveyor can be relatively high. Typically, the bed of polyolefin has a thickness of up to 20 cm, most particularly from 5 to 10 cm. The bed of polyolefin on the conveyor typically has a width of up to about 1 metre. Preferably, the irradiation is carried out under an inert atmosphere, such as nitrogen.

After irradiation by the electron beam, the polyolefin powder can be annealed and then treated with at least one known antioxidant additive. The annealing temperature may range from 50 to 150° C. more preferably from 80 to 120° C. and the annealing time may range from 1 to 60 minutes, more preferably from 5 to 30 minutes. Thereafter the polyolefin is mechanically processed, e.g. by extrusion, and granulated.

In accordance with a preferred aspect of the invention, the irradiated polypropylene has increased melt strength. This particular rheological property provides an outstanding processing behaviour which allows the polypropylene based polymers produced in accordance with the invention to be suitable particularly for producing films, sheets, fibres, pipes, foams, hollow articles, panels and coatings. The irradiated polypropylene also has improved mechanical properties, such as flexural modulus and impact resistance, and improved Theological properties such as recovery compliance and relaxation time.

The invention will now be described in greater detail with reference to the following non-limiting examples and the accompanying drawings, in which.

EXAMPLES 1 TO 3 AND COMPARATIVE EXAMPLE 1

In these Examples and Comparative Example, an isotactic polypropylene produced using a metallocene catalyst (thereby producing miPP representing metallocene-synthesised isotactic polypropylene) comprising methyl benzyl indenyl zirconium dichloride, the polymerisation having been performed without the addition of hydrogen gas during the polymerisation process. The reaction temperature was 65° C., the propylene, throughput was around 60 kg/h, no hydrogen or comonomer was fed and the isobutane feed was 4 kg/h. The resultant polypropylene homopolymer had a double bond (or unsaturation) concentration of around 1.4 per 10,000 carbon atoms, which was determined by proton NMR analysis, a technique which is known to those skilled in the art. The resultant miPP had a melt flow index (MFI) of around 6 dg/min. In this specification, the melt flow index (MFI) is measured by the procedure of ASTM D 1238 using a load of 2.16 kg at a temperature of 230° C. for polypropylene.

The polypropylene was then subjected to electron beam irradiation. Prior to irradiation, the polypropylene fluff was stabilised with 200 ppm Irganox 1076. In particular, the polypropylene was deposited onto an endless belt conveyor having a speed varying between 8.8 m/minute for an irradiation dose of 15 kGray and 2.2 m/minute for an irradiation dose of 60 kGray. The polypropylene powder was deposited onto the conveyor as a bed having a thickness of 7 cm. The conveyor conveyed the bed under a high energy high power electron accelerator. Such accelerators are available in commerce. The accelerator had an energy of 10 MeV and a power of 120 kW. The polypropylene powder was divided into three samples for Examples 1 to 3 respectively and irradiated for a period of time (determined by the conveyor speed) sufficient to provide varying respective radiation doses of 15, 30 and 60 kGray for Examples 1 to 3. During the irradiation, the powder was maintained under argon (or nitrogen) to exclude oxygen.

After irradiation, the powder was kept under nitrogen and was mixed with conventional antioxidant additives comprising 0.500 ppm Irganox 3114, 1000 ppm Irgafos 168 and 400 ppm calcium stearate.

After the addition of the antioxidant additives, the powder was extruded and granulated at 220° C. under an argon atmosphere.

The properties of the polypropylene of Examples 1 and 3 and Comparative Example 1 are shown in Table 1.

Figure 1:
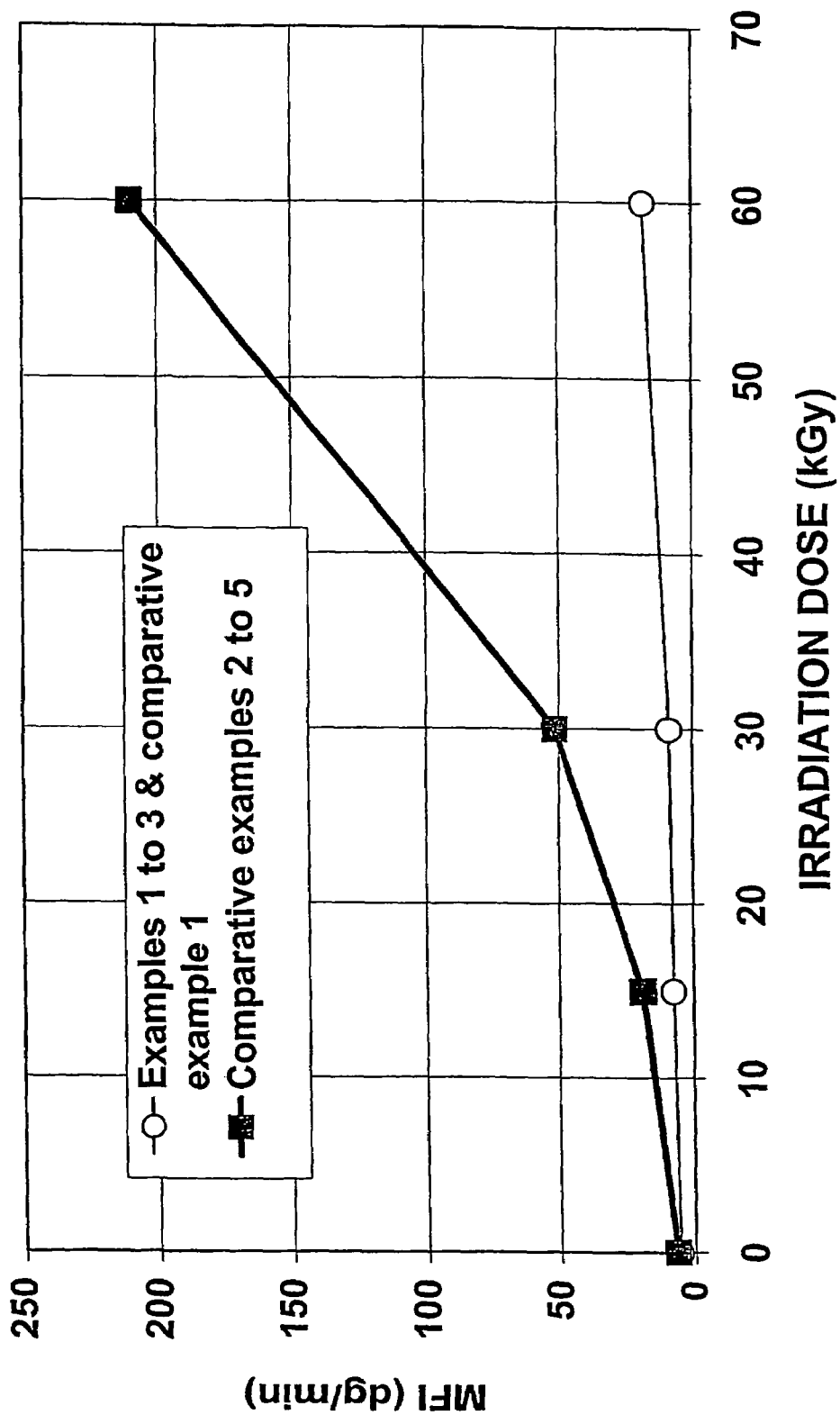
FIG. 1 is a graph showing the relationship between melt flow index (MFI) and irradiation dose for polypropylenes produced in accordance with Examples 1 to 3 of the process of the invention and Comparative Examples 1 to 5.

The MFI of a sample of the initial non-irradiated miPP of Comparative Example 1 and the three samples of the miPP of Examples 1 to 3 having been irradiated at the three different radiation doses of 15, 30 and 60 kGray were measured and the results are shown in FIG. 1. For Comparative Example 1 there was no irradiation (i.e. a zero irradiation dose). The MFI values for radiation doses of 0, 15, 30 and 60 kGray were, respectively, 5.8, 7.9, 9 and 17.9 g/10 min. For the miPP, it may be seen that the irradiation dose does not strongly increase the MFI.

Figure 2:
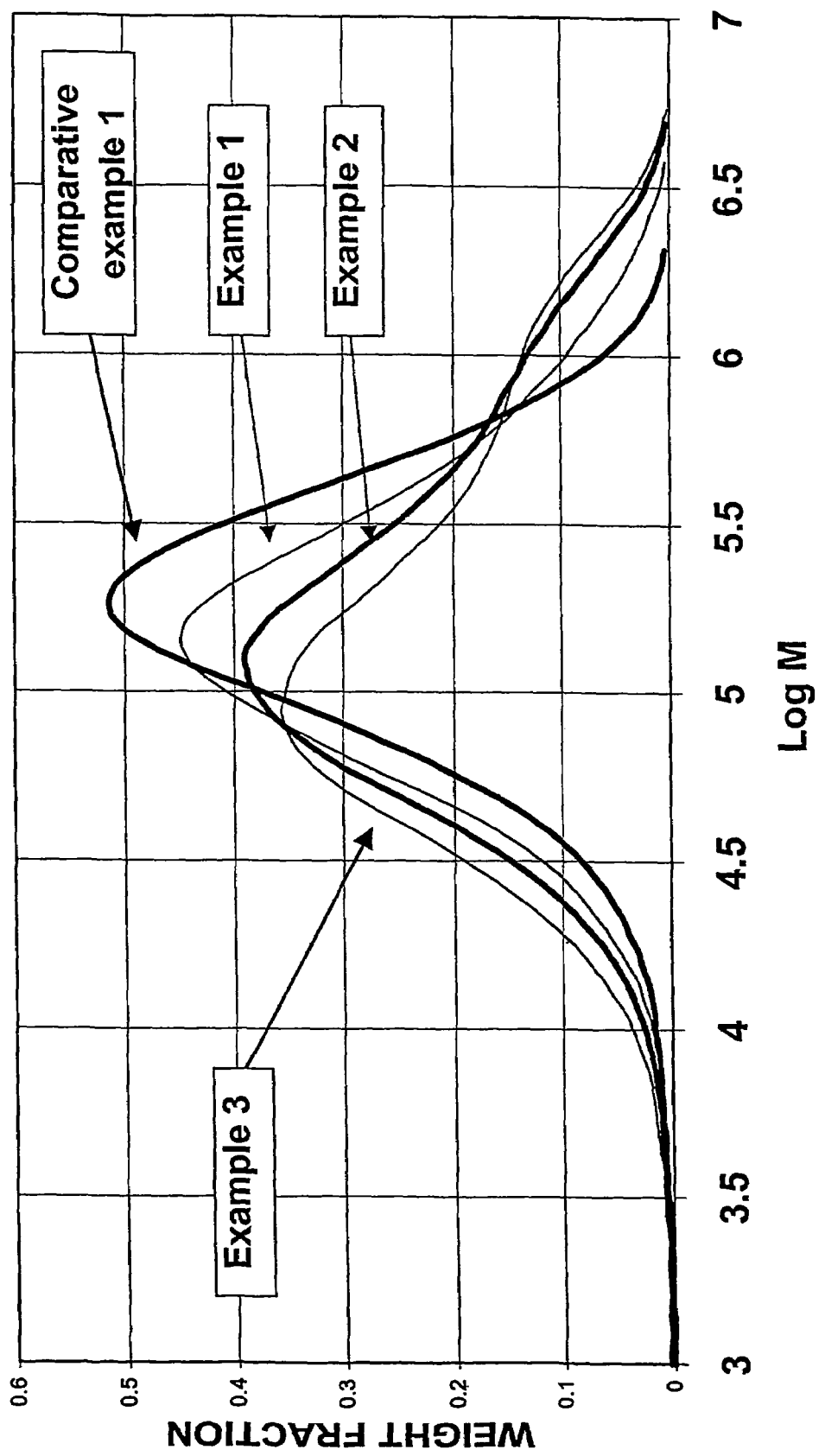
FIG. 2 is graph showing the molecular distribution of the polypropylenes of Examples 1 to 3 and Comparative Example 1.

In addition, for the four samples, namely the unirradiated sample of Comparative Example 1 and the three irradiated samples of Examples 1 to 3, the molecular weight distribution was determined by gel permeation chromatography and the resultant molecular weight distribution curves are shown in FIG. 2.

From FIG. 2 it may be seen that the irradiation causes a shifting of the number average molecular weight (Mn) to the lower molecular weight side with increasing irradiation dose, leading to a decrease in the Mn at increasing irradiation dose. Moreover, a second peak in the molecular weight distribution on the high molecular weight side progressively appears in the high molecular weight region with increasing irradiation dose, leading to a bimodal molecular weight distribution for the irradiated miPP at higher irradiation doses. This increases the weight average molecular weight (Mw) and third order average molecular weight (Mz) with increasing irradiation dose. Thus the higher irradiation doses causes the formation of large molecules giving a second peak in the high molecular weight end of the molecular weight distribution.

It is believed that two actions occur simultaneously as a result of the irradiation. Chain scission which is represented by the low molecular weight peak causes shifting of the peak towards lower molecular weight as the irradiation dose increases. The width of the low molecular weight peak is slightly decreased by the irradiation. In addition, the formation of long chain branching leads to the appearance of a high molecular weight peak which extends towards the lower molecular weight side. For the four curves shown in FIG. 2, the dispersion index D increases from 2.7 for the unirradiated polypropylene of Comparative Example 1 to dispersion indexes of 3.4, 4.2 and 5.2 for the respective radiation doses of 15, 30 and 60 kGray for Examples 1 to 3. Thus for the miPP, the irradiation cuts the polymer chain but at the same time permits more recombination to form branched polymers having a high molecular weight at increasing irradiation doses.

Figure 3:
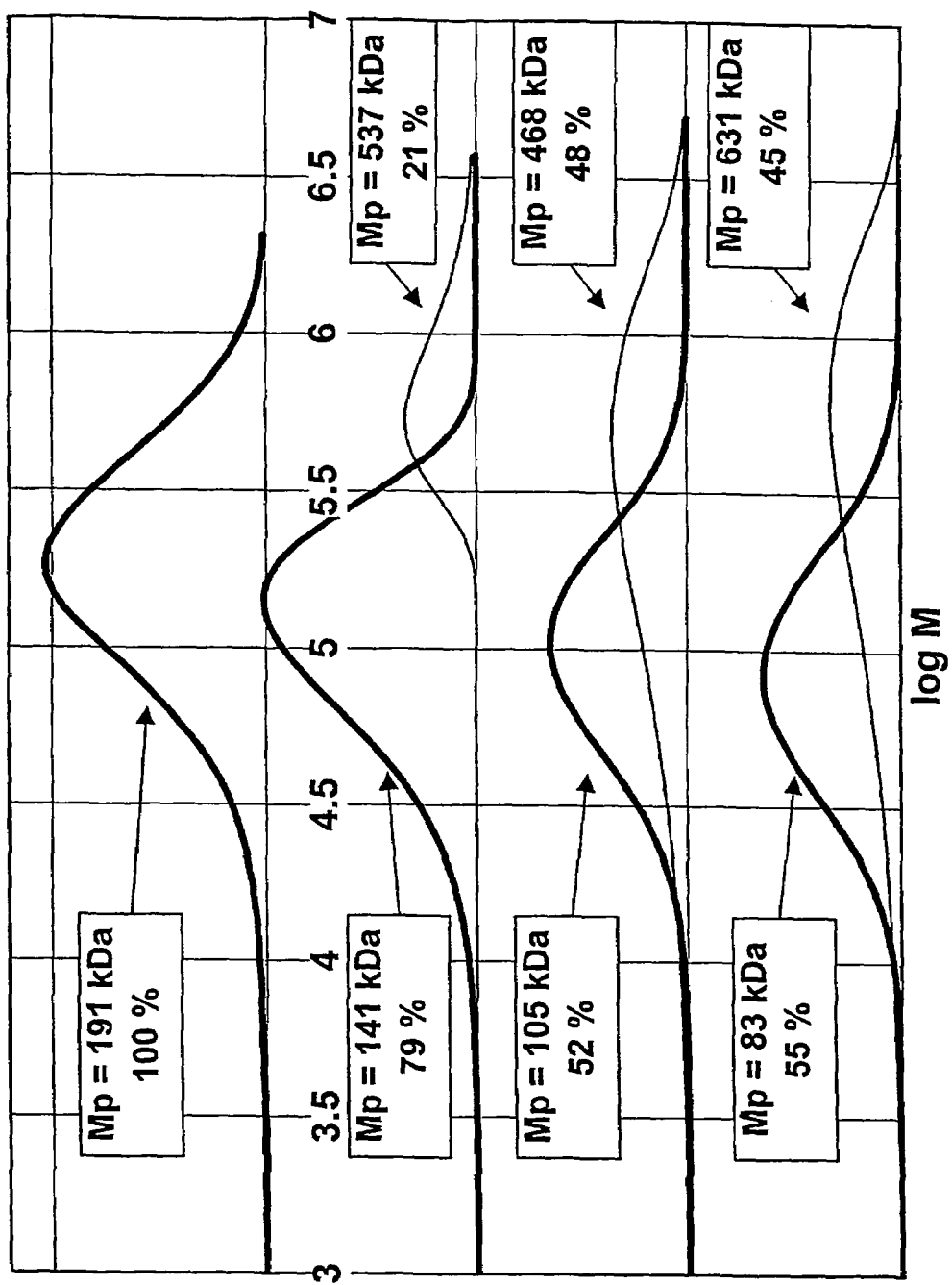
FIG. 3 is a graph showing, for Comparative Example 1, the molecular weight distribution of the polymer, and, for Examples 1 to 3, the high and low molecular weight fractions of the molecular weight distribution of the polymer produced as a result of the irradiation of the polymers.

FIG. 3 shows the variation in molecular weight distribution for increasing the radiation doses for the four molecular weight distribution curves shown in FIG. 2 showing the separate contributions to the molecular weight distribution as a result of chain scission and long chain branching. Thus for the miPP, it may be seen that the irradiation causes polymer scission but allows recombination of the branched polymers to yield a higher molecular weight.

The difference between the non-irradiated and irradiated materials can be expressed as the % area above the maximum peak value (Mp) in the molecular weight distribution curves. From Table 1 it may be seen that for Examples 1 to 3 the proportion of the material having a molecular weight greater than Mp was 52.6%, 61.0% and 61.0%, respectively, much higher than for the non-irradiated material of Comparative Example 1 at 47.3%. This shows that the irradiation increases long chain branching. For the gel permeation chromatography of branched molecules, the measured molecular weight tends to be underestimated compared to linear molecules.

The melt strength of the unirradiated polypropylene of Comparative Example 1 and the irradiated polypropylene of Examples 1 to 3 at the three different irradiation doses was then measured at 210° C. The melt strength was measured using a CEAST rheometer (Rheoscope 1000) equipped with a capillary die and a rotating wheel as a take-up device. Molten polymer was extruded through the capillary die by application of a pressure resulting from the displacement of a piston. The molten extrudate was uniaxially stretched before crystallisation by wrapping the fibre around the rotating wheel. In the test, the piston displacement rate was fixed and the speed of the rotating take-up wheel was linearly changed at constant acceleration until the fibre, becoming very thin, breaks. The tensile force was recorded during the test. The test was run with a cylindrical die having a length/diameter ratio of 5 mm/1 mm. The diameter of the rotating wheel was 120 mm and the displacement rate of the piston was 2 mm/min giving an extrudate throughput of 2.36 mm$^3$/min. The acceleration of the rotating wheel was constant at 10 rpm/100 seconds, or 0.000628 m/s$^2$. The extrusion temperature was 210° C. During the melt strength experiments, the recorded force rapidly obtained a constant value that remained independent of wheel rpm up to rupture.

The melt strength was defined as the maximum tensile force recorded during the experiment. The melt strength values for each of the four polypropylene samples are shown, with respect to the irradiation dose, in Table 1 and FIG. 4. It may be seen that the melt strength increases with irradiation for the miPP. From the GPC analysis, the molecular weight of miPP increases with the irradiation dose, and the increase in long chain branching correspondingly increased the melt strength.

Figure 5:
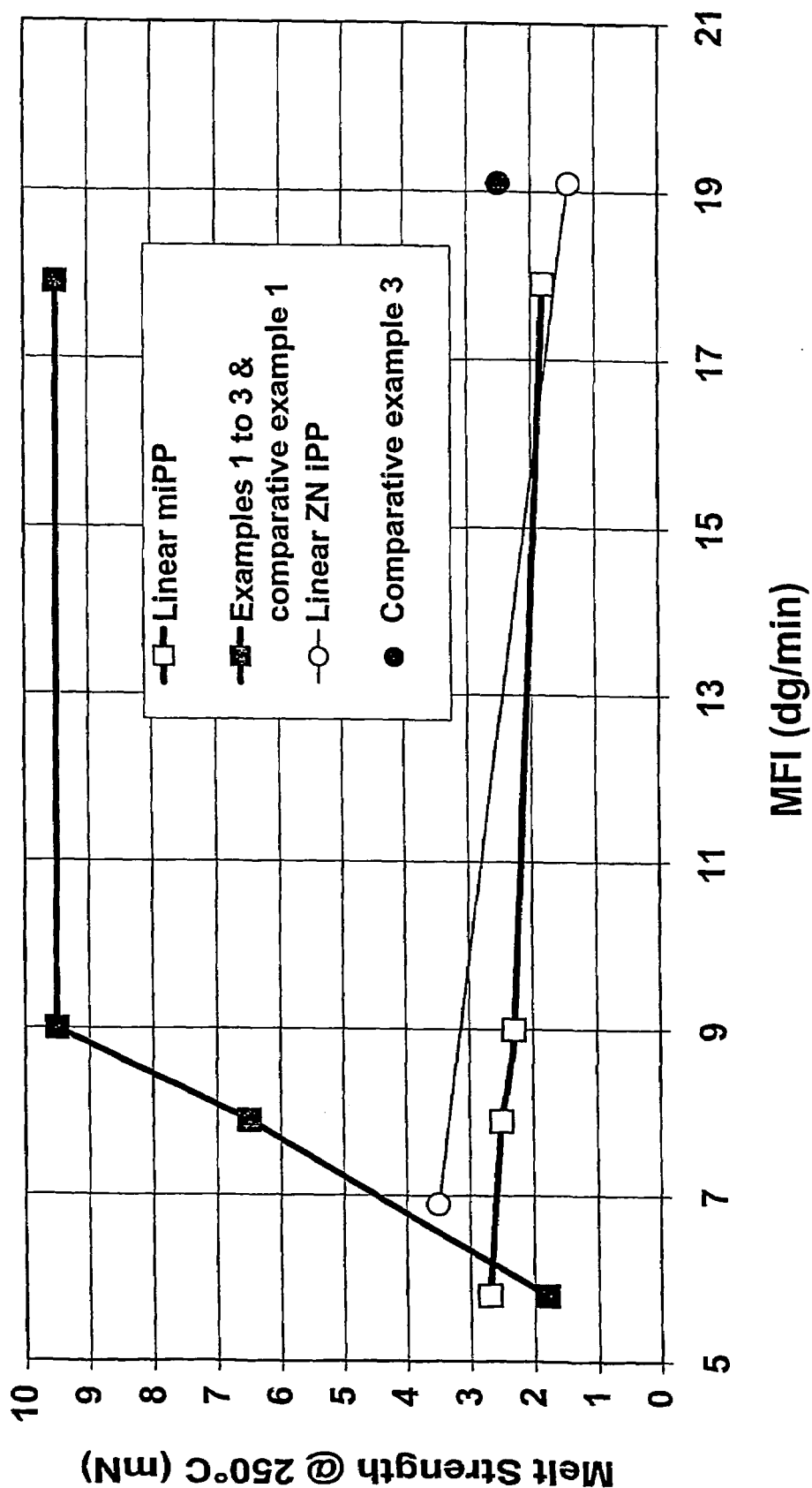
FIG. 5 is shows the relationship between melt strength and MFI for the polypropylenes of Examples 1 to 3 and Comparative Examples 1 and 3 and also linear miPPs and Ziegler-Natta iPP having the same molecular characteristics, in particular MFI.

The melt strength was correspondingly measured at 250° C. both for linear (non-irradiated) miPP and ZNiPP having varying MFI values and for irradiated miPP produced in accordance with Examples 1 to 3 the invention having the same varying MFI values. The results are shown in FIG. 5. It may be seen that the melt strength of the irradiated miPP increases at low MFI values up to a substantially constant melt strength value for increasing MFI.

The melt strength was also measured at 185° C. with a rotating wheel diameter of 19 cm and with a variable displacement rate of the piston of from 1 to 12 mm/min. The speed of the rotating wheel was adjusted to keep constant the titre of the fibre (10 deniers or 11.1 dTex). The tensile force corresponding to a stretching rate of 3.3 m/s (330 rpm) was defined as the melt strength. The melt strength values are shown in Table 1 for Comparative Example 1 and Examples 1 to 3. The melt strength for Examples 1 to 3 is significantly higher than that for Comparative Example 1.

For linear non-irradiated miPP, the melt strength is significantly lower than that of the irradiated miPP and decreases slightly with increasing MFI.

It is known that a strong increase of melt viscosity (i) at low frequency is observed for polypropylene containing long chain branching structures. The relationship between the shear viscosity of the polypropylene melt and the circular frequency is dependent upon the degree of long chain branching.

In order to quantify the amount of long chain branching in isotactic polypropylene, the applicant has formulated a parameter, referred to herein as the branching factor g, which is determined from the rheological properties of the polymer. The long chain branching factor g was established by the ratio $M_w$ (COP)/$M_w$ (ρ0) where $M_w$ (COP) is the weight average molecular weight at the crossover point coordinates ($W_c$ and $G_c$) (as discussed hereinbelow) and $M_w$ (ρ0) is the weight average molecular weight at zero shear viscosity. The branching factor is equal to 1±0.05 for linear isotactic polypropylene and is less than 1 for isotactic polypropylene with long chain branching. The branching factor g is determined from the ratio of two weight average molecular weight ($M_w$) values inferred from a dynamic frequency sweep on a viscoelastimeter such as the models available in commerce under the trade names RDA 700 or ARES 700 from the company Rheometrics Scientifics.

The branching factor is determined as follows. For the viscoelastimeter available from Rheometrics Scientifics under the trade name ARES, the operating conditions were set up as follows: the strain was set up to be from 10 to 20%, i.e. in the linear viscoelastic range; the frequency sweep was from 0.1 to 500 radians/second; the plate-plate geometry was 25 mm diameter, with a polymer thickness therebetween of typically around 2 mm. In some instances, the same testing experiment was conducted at different melt temperatures, for example at 190° C. and 210° C., and the viscoelastic responses expressed at the reference temperature of 230° C. using a master curve approach, which is described in the paper entitled "Temperature dependence of polyolefin melt rheology", H. Mavridis and R. N. Shroff, Polymer Eng. Sci. 32, 1778 (1992).

From the data obtained, the storage (G') and loss (G") shear moduli, as well as the complex shear melt viscosity (η*) were plotted as a function of circular frequency at the reference temperature of 230° C. A cross-over point (COP) for the storage and loss shear moduli was observed for all the isotactic polypropylenes investigated. The cross-over point (COP) coordinates $G'=G''=G_c$ and the corresponding circular frequency $W_c$ can be used to infer information pertaining to the weight average molecular weight $M_w$ and its polydispersity as first proposed in the paper by G. R. Zeichner and P. D. Patel, Proc. 2$^{nd}$ World Cong. Chem. Eng. 6, 333 (1981).

The applicants tested 33 linear isotactic polypropylenes with $M_w$ values ranging from 70 kDa to 1200 kDa and polydispersity index (D=$M_w/M_n$) values of from 2 to 25 and found the following equation for the molecular weight at the cross-over point to apply:

$$M_w(COP)=exp(6.767-0.187*(LnWc)-0.0129*(LnWc)^2)$$

The weight average molecular weight ($M_w$) is specified in kDa, and is calculated with a standard deviation estimated to be around 5%.

For the value $M_w$ (η0) which is the weight average molecular, weight at zero shear viscosity, this is calculated as follows. From the shear viscosity curve, it is possible to extrapolate the viscosity to the zero shear rate viscosity using an equation known as the Carreau-Yasuda equation which is described in the paper entitled "Correlation Between Molecular Structure and Rheological Behaviour of Polypropylene", K. Bernreitner, W. Neissl and M. Gahleitner, Polymer Testing, 11, 89 (1992). As is well known in the literature, a power law relationship exists between $η_0$ and $M_w$. Accordingly, using the same data as set out for the cross-over point, the following equation for the weight average molecular weight at zero shear viscosity has been determined:

$$M_w(η_0)=exp(3.5897+0.267*Ln(η_0))$$

The weight average molecular weight $M_w$ is expressed in kDa with a standard deviation around 6%. The viscosity is expressed in Pascal. seconds.

The branching factor g for any given isotactic polypropylene is the ratio between the calculated value and $M_w$ (COP)/$M_w$ (η$_0$).

Figure 6:
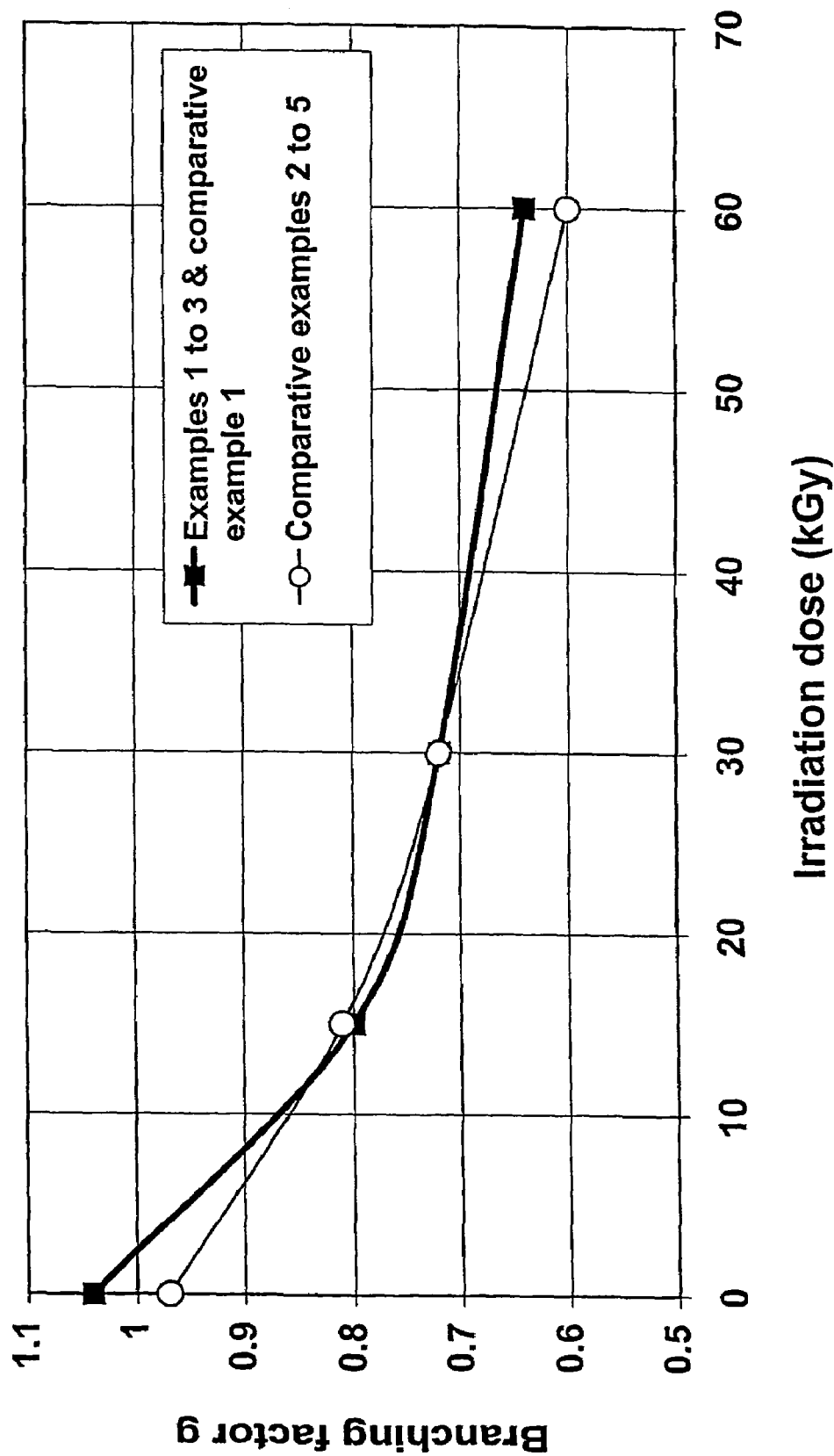
FIG. 6 is a graph showing the relationship between the branching factor g and irradiation dose for the polypropylenes of Examples 1 to 3 and Comparative Examples 1 to 5.

For the four samples, the relationship between the branching factor and the irradiation dose is shown in FIG. 6. It may be seen that the degree of long chain branching increases, as represented by decreasing branching factor g, with increasing irradiation dose.

Figure 7:
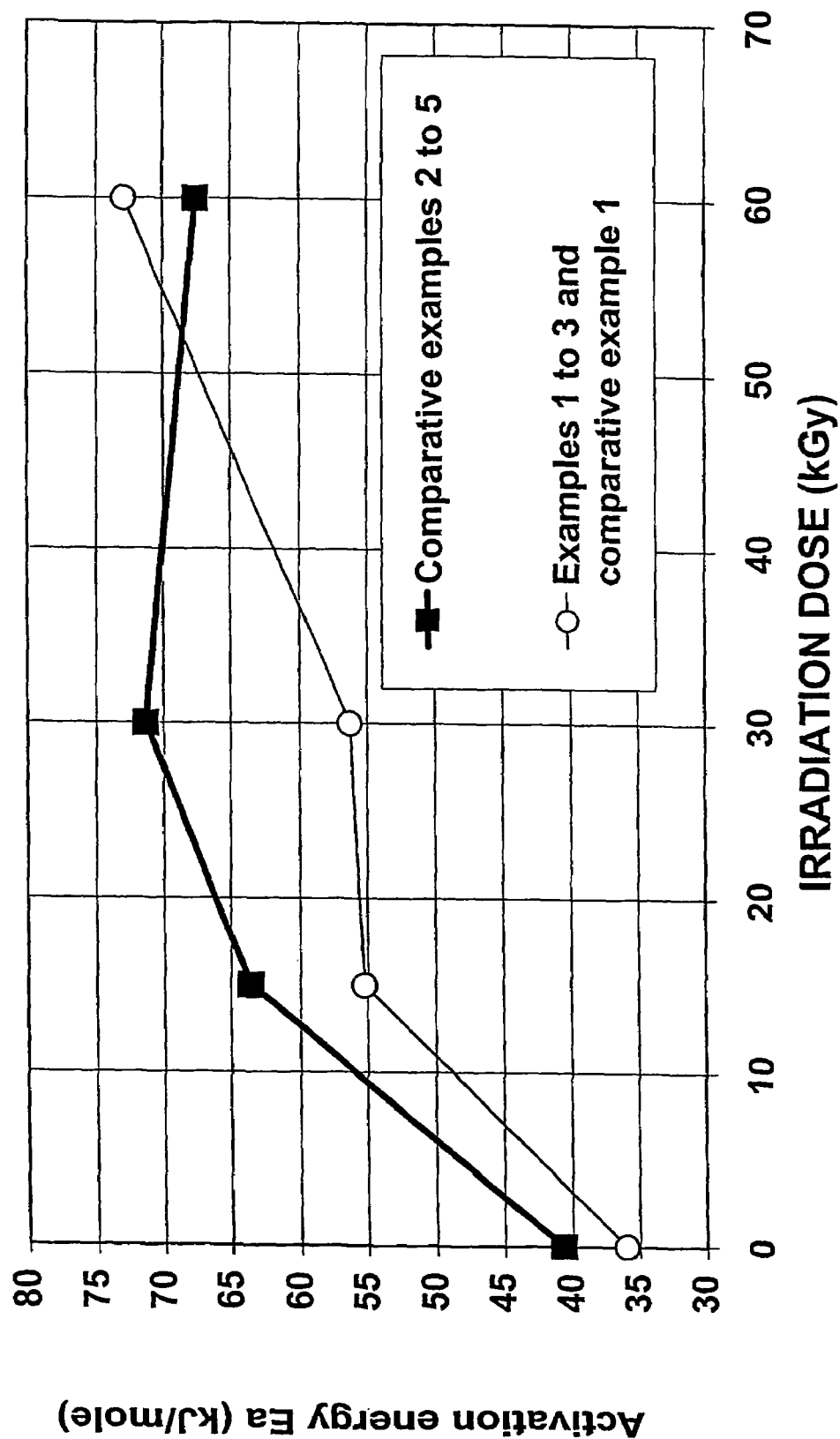
FIG. 7 is a graph showing the relationship between the activation energy and irradiation dose for the polypropylenes of Examples 1 to 3 and Comparative Examples 1 to 5.

FIG. 7 shows the relationship between activation energy and irradiation dose for Comparative Example 1 and Examples 1 to 3. The activation energy represents the energy necessary to activate the molecule to move in the melt. It may be seen that with increasing irradiation dose, the activation energy increases. This indicates that long chain branching increases, with increasing irradiation dose, since this is manifested in the increased activation energy.

The polypropylene was injection molded at 210° C. in a mold kept at 40° C. to form elongate bars for testing of the flexural Young's modulus in accordance with ISO standards, (8 cm×1 cm×0.4 cm). Table 1 shows that for miPP the flexural Young's modulus increases with the irradiation. The irradiation has the same effect as a crystallisation nucleating agent. The flexural Young's modulus (between a strain of from 0.05 to 0.25%) of Example 3 was higher than that of a nucleated miPP having the same MFI but not irradiated (1490 MPa).

The irradiation was found not to increase the IZOD impact strength of the miPP.

COMPARATIVE EXAMPLES 2 TO 5

In these Comparative Examples an isotactic polypropylene produced using a Ziegler-Natta catalyst (hereinafter "ZNiPP", as opposed to a metallocene catalyst, and with an MFI of around 7 dg/min was divided into four samples, one of which was not irradiated (Comparative Example 2) and three of which were irradiated in a manner similar to that for Examples 1 to 3 (Comparative Examples 3 to 5). The properties of the polypropylenes of Comparative Examples 2 to 5 are shown in Table 2. The relationship between MFI and irradiation dose for Comparative Examples 2 to 5 is also shown in FIG. 1. It will be seen that for ZNiPP, as opposed to miPP, the melt flow index greatly increases with increasing irradiation dose.

Figure 8:
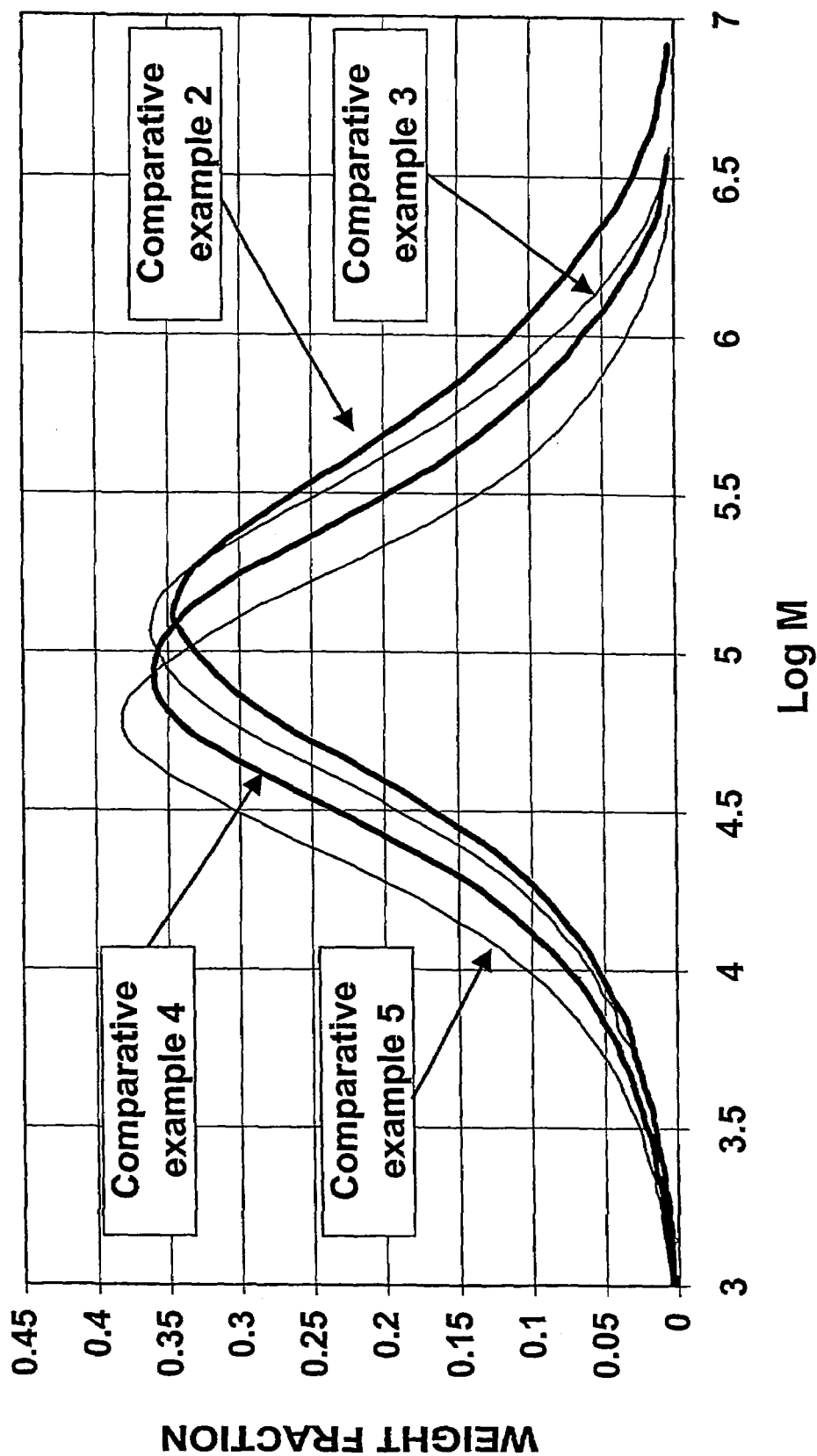
FIG. 8 is a graph showing the molecular weight distribution of the polypropylenes of Comparative Examples 2 to 5.

In addition, the molecular weight distributions for the ZNiPP of Comparative Examples 2 to 5 were measured and the results are shown in FIG. 8 and Table 2. It may be seen for the ZNiPP, in contrast to the miPP, that the irradiation of the ZNiPP does not bring about a second peak in the molecular weight distribution with increase of irradiation dose. With increasing irradiation dose, the molecular weight distribution curves are shifted to the lower molecular weight side and the curves become narrower, i.e. with a reduction in the dispersion index D. Regarding the proportion of the molecular weight distribution having molecular weight greater than Mp, it may be seen that this decreases slightly on irradiation going from Comparative Example 2 to Comparative Examples 3 to 5, the values also being significantly less than for Examples 1 to 3. This means that for ZNiPP, the electron beam irradiation tends to cause more scission of the polymer chains than recombination to form long chain branched polymers. The kinetics of recombination in long branched chains is less important that the scission of the chains.

Figure 4:
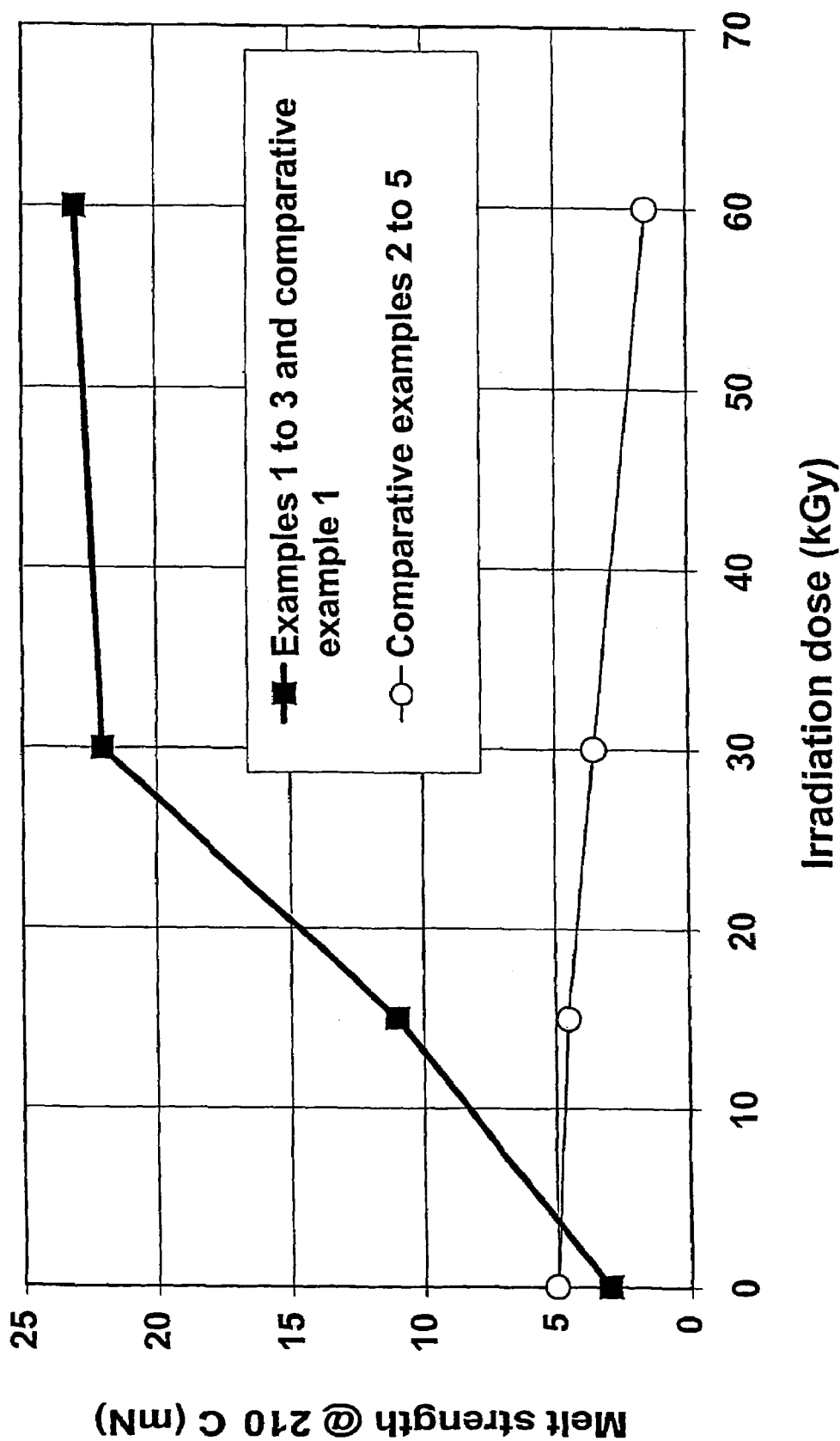
FIG. 4 is a graph showing the relationship between melt strength and irradiation dose for polypropylenes produced in accordance with Examples 1 to 3 and Comparative Examples 1 to 5.

For the polypropylenes of Comparative Examples 2 to 5, the melt strength was also measured and the relationship between melt strength and irradiation dose is shown also in FIG. 4 and Table 2. It will be seen that the melt strength of the ZNiPP decreases with increasing radiation dose. Since the molecular weight of the ZNiPP decreases with increasing irradiation, this causes a decrease of the melt strength, despite any increase in the presence of long chain branching which in turn is indicated by an increase in activation energy with irradiation.

FIG. 7 also shows the relationship between activation energy and irradiation dose for the polypropylenes of Comparative Examples 2 to 5. It may be seen that the activation energy for the ZNiPP polypropylenes of Comparative Examples 2 to 5 does increase with increasing irradiation dose, representing an increase in long chain branching.

For the ZNIPP, a lot of chains were cut by the irradiation, thereby increasing the MFI. This improves the crystallinity, but the Young's modulus does not increase as a result of the irradiation. As for miPP, the irradiation was found not to increase the IZOD impact strength of the ZNiPP.

COMPARATIVE EXAMPLE 6

For Comparative Example 6 the ZNiPP of Comparative Examples 2 to 5 was treated at an irradiation dose of 15 kGray but the antioxidant additives were modified as compared to Comparative Examples 2 to 5 by the addition of 700 ppm Irganox 1010 instead of 500 ppm Irganox 3114 and 1100 ppm Irgafos 168 instead of 1000 ppm Irgafos 168 and in addition, a grafting agent comprising 2500 ppm tetravinyl silane was added prior to irradiation. The melt strength value at 210° C. for the resultant polymer of Comparative Example 6 was tested and the results are shown in Table 2 and FIG. 4. It may be seen that even with the addition of branching or grafting agent to the ZNiPP in accordance with the Comparative Example 6, the melt strength is significantly less than that for the irradiated miPP in accordance with Example 3 having substantially the same MFI of around 18 g/10 min. From Table 2 it is seen that there is an increase in activation energy following irradiation in combination with the use of a branching or grafting agent as compared to the unirradiated polymer without a branching or grafting agent.

TABLE 1

| | miPP | | | |
|---|---|---|---|---|
| Polymer | Comparative Example 1 | Example 1 | Example 2 | Example 3 |
| Irradiation dose (kGray) | 0 | 15 | 30 | 60 |
| MFI (dg/min) | 5.8 | 7.9 | 9 | 17.9 |
| Mn (kDa) | 82.8 | 71.8 | 69.3 | 57.3 |
| Mw (kDa) | 227 | 246 | 289 | 299 |
| Mz (kDa) | 426 | 695 | 989 | 1160 |
| D | 2.7 | 3.4 | 4.2 | 5.2 |
| D' | 1.9 | 2.8 | 3.4 | 3.9 |
| Branching factor g | 1.04 | 0.8 | 0.72 | 0.64 |
| Melt Strength @ 185° C. (mN) | 6 | 20 | >50 | >50 |
| Melt Strength @ 210° C. (mN) | 3 | 11 | 22 | 23 |
| Melt Strength @ 250° C. (mN) | 1.8 | 6.5 | 9.5 | 9.5 |
| Ea (kJ/mole) | 36 | 55.2 | 56.3 | 72.9 |
| Young's modulus (MPa) | 1363 | — | — | 1713 |
| % > $M_p$ | 47.3 | 52.6 | 61.0 | 61.0 |

TABLE 2

| | ZNiPP | | | | |
|---|---|---|---|---|---|
| Polymer | Comp. Example 2 | Comp. Example 3 | Comp. Example 4 | Comp. Example 5 | Comp. Example 6 |
| Irradiation dose (kGray) | 0 | 15 | 30 | 60 | 15 |
| MFI (dg/min) | 6.9 | 19.1 | 51.3 | 210 | 30.4 |
| Mn (kDa) | 48.2 | 45.8 | 37 | 29.5 | 43.1 |
| Mw (kDa) | 297 | 211 | 176 | 122 | 207 |
| Mz (kDa) | 1347 | 687 | 628 | 423 | 884 |
| D | 6.2 | 4.6 | 4.8 | 4.1 | 4.8 |
| D' | 4.5 | 3.2 | 3.6 | 3.5 | 4.3 |
| Branching factor g | 0.97 | 0.81 | 0.72 | 0.6 | — |
| Melt Strength @ 185° C. (mN) | 8.6 | 8.6 | 8.3 | 3.3 | 14 |
| Melt Strength @ 210° C. (mN) | 5 | 4.5 | 3.5 | 1.5 | 8 |
| Melt strength @ 250° C. (mN) | 3.5 | 2.5 | 2 | 0 | 4.5 |
| Ea (kJ/mole) | 40.7 | 63.6 | 71.3 | 67.6 | 68 |
| Young's modulus (MPa) | 1370 | 1404 | 1427 | 1371 | — |
| % > $M_p$ | 52.4 | 51.5 | 50.1 | 50.1 | — |

The invention claimed is:

1. A process for producing a propylene polymer having increased melt strength, the process comprising (i) homopolymerising polypropylene or copolymerizing propylene with at least one comonomer selected from the group consisting of ethylene and $C_4$ to $C_{10}$ 1-olefin to produce a polypropylene homopolymer or copolymer respectively having a double bond concentration of at least 0.1 per 10,000 carbon atoms, (ii) irradiating the propylene polymer with an electron beam having an energy of at least 5 MeV and at a radiation dose of at least 5 kGray, and (iii) melting the propylene polymer and mechanically processing the melt of said propylene polymer to form long chain branches on the propylene polymer molecules.

2. A process according to claim 1 wherein the propylene polymer is polymerised using a single site catalyst.

3. A process according to claim 1 wherein the electron beam has an energy of at least 10 MeV.

4. A process according to claim 1 wherein the electron beam has an energy within the range of 10–25 MeV.

5. A process according to claim 1 wherein the power of the electron beam is from 50 to 500 kW.

6. A process according to claim 1 wherein the power of the electron beam is from 120 to 250 kW.

7. A process according to claim 1 wherein the radiation dose is at least 10 kGray.

8. A process according to claim 6 wherein the radiation dose is within the range of 10–60 kGray.

9. A process according to claim 6 wherein the radiation dose is within the range of 20–40 kGray.

10. A process for producing polypropylene having increased melt strength, the process comprising irradiating polypropylene which has been polymerised using a metallocene catalyst with an electron beam having an energy of at least 5 MeV and a radiation dose of at least 5 kGray and melting the polypropylene and mechanically processing the melt of the irradiated polypropylene to form long chain branches on the polypropylene molecules.

11. A process according to claim 10 wherein the electron beam has an energy of at least 10 MeV.

12. A process according to claim 10 wherein the power of the electron beam is from 50 to 500 kW.

13. A process according to claim 10 wherein the power of the electron beam is from 120 to 250 kW.

14. A process according to claim 10 wherein the radiation dose is at least 10 kGray.

15. A process according to claim 14 wherein the radiation dose is within the range of 10–60 kGray.

16. A process according to claim 15 wherein the radiation dose is within the range of 20–40 kGray.

* * * * *